(12) United States Patent
Park

(10) Patent No.: US 6,880,733 B2
(45) Date of Patent: Apr. 19, 2005

(54) AEROSOL VALVE ASSEMBLY AND AEROSOL VESSEL

(76) Inventor: Jin-Ha Park, 101-104 Kangbyun Apartment, 1-2 Mannyun-dong-Seo-ku, Taejon 302-150 (KR)

( * ) Notice: Subject to any disclaimer, the term of this patent is extended or adjusted under 35 U.S.C. 154(b) by 245 days.

(21) Appl. No.: 10/220,625

(22) PCT Filed: Apr. 4, 2002

(86) PCT No.: PCT/KR02/00602
§ 371 (c)(1),
(2), (4) Date: Aug. 30, 2002

(87) PCT Pub. No.: WO02/084169
PCT Pub. Date: Oct. 24, 2002

(65) Prior Publication Data
US 2003/0071078 A1 Apr. 17, 2003

(30) Foreign Application Priority Data

| Apr. 11, 2001 | (KR) | ................................... 2001-19164 |
| May 29, 2001 | (KR) | ................................... 2001-29635 |
| Oct. 20, 2001 | (KR) | ................................... 2001-64973 |

(51) Int. Cl.$^7$ ................................... B65D 83/000
(52) U.S. Cl. ................... 222/397; 222/402.24; 251/354
(58) Field of Search ................... 222/396, 397, 222/402.1, 402.24; 251/353, 354

(56) References Cited

U.S. PATENT DOCUMENTS

| 3,005,577 A | * | 10/1961 | Webster | ...................... 222/397 |
| 3,081,919 A | * | 3/1963 | Samuel | ........................ 222/396 |
| 3,870,203 A | * | 3/1975 | Frankenberg | ................ 222/397 |
| 4,030,644 A | * | 6/1977 | Creighton | .................... 222/396 |
| 5,183,189 A | * | 2/1993 | Baudin | ........................ 222/397 |

* cited by examiner

Primary Examiner—Michael Mar
Assistant Examiner—M A Cartagena
(74) Attorney, Agent, or Firm—Cantor Colburn LLP

(57) ABSTRACT

An aerosol vessel, which can be prevented from deforming and exploding by discharging gas when an excessive pressure occurs in a main body, is provided. The aerosol vessel includes a valve assembly basically including a nozzle body fixed to the main body; a valve stem installed at the nozzle body such that it can move up and down and has a gas inlet and a gas ejection passage; an opening/closing ring installed between the nozzle body and the valve stem such that it contacts and is removably supported by a support sill of the nozzle body in order to open or close the gas inlet; and an elastic unit for restoring the valve stem after operation and elastically supporting the opening/closing ring with respect to the support sill. When an excessive pressure occurs in the main body, the opening/closing ring moves upward and overcompressed gas is discharged through the gas inlet or a gap between the valve stem and a support member. The elastic unit may be composed of a contact spring for applying pressure the opening/closing ring and a support spring for elastically support the valve stem. An extra gas outlet may be formed in the valve stem in order to discharge the overcompressed gas.

6 Claims, 15 Drawing Sheets

AEROSOL VALVE ASSEMBLY AND AEROSOL VESSEL

TECHNICAL FIELD

The present invention relates to an aerosol valve assembly and an aerosol vessel, and more particularly, to an aerosol valve assembly and an aerosol vessel for preventing the deformation or explosion of a vessel, such as a portable gas vessel which is filled with contents and a propellant gas, by discharging the gas before the vessel deforms when the inner pressure of the vessel exceeds a predetermined pressure.

BACKGROUND ART

Generally, aerosol vessels indicate vessels that are filled with a substance (liquid or gas) to be sprayed and a propelling agent or propellant gas and hermetically sealed so that the substance can be sprayed using the pressure of the spray gas. Here, gas such as liquefied petroleum gas (LPG), dimethyl ether (DME), Freon, carbon dioxide, nitrogen, or oxygen is used as a propellant gas. A portable gas vessel, a mosquito sprayer, a hair sprayer, and a portable aerosol fire-extinguisher are representative aerosol vessels.

Since aerosol vessels, such as a portable gas vessel, a mosquito sprayer, a hair sprayer, and a portable aerosol fire-extinguisher, are filled with gas for ejecting contents, they are in danger of deforming or exploding when a pressure exceeding a predetermined value occurs in them.

As an example of an aerosol vessel, a portable gas vessel 10 shown in FIGS. 1 and 2 includes a main body 12 which has a cylindrical shape and receives gas therein; a top sealing cap 14 and a bottom sealing cap 14a which are integrally seamed to the top and bottom, respectively, of the main body 12 in order to hermetically seal the main body 12; a support member 20 which is compressively clamped at the center of the top sealing cap 14; and a nozzle assembly 30 which is installed at the support member 20 in order to eject gas stored within the main body 12. Hereinafter, a part including the support member 20 and the nozzle assembly 30 is defined as an aerosol valve assembly.

The nozzle assembly 30 includes a nozzle body 32 which is coupled with the support member 20 through the center of the support member 20 and is supported by the support member 20. The nozzle body 32 includes a predetermined space 32a, an opening at its top, and a gas inflow passage 32b at its lower portion. A valve stem 34 is installed such that it pierces through the center of the support member 20 and can move up and down within the upper portion of the nozzle body 32. The valve stem 34 includes a gas inlet 34a, through which gas stored in the main body 12 flows into the valve stem 34, and a gas ejection passage 34b, through which gas flowing in through the gas inlet 34a is ejected to the outside. An opening/closing ring 36 for opening or closing the gas inlet 34a of the valve stem 34 is installed at a portion where the support member 20 is coupled with the nozzle body 32. A support spring 38 for providing elasticity for an up-and-down motion of the valve system 34 is installed within the lower portion of the nozzle body 32.

In such a structure, during a normal use, when the valve stem 34 is pressed down into the main body 12 by an external force, the gas inlet 34a is opened due to the elastic transformation of the opening/closing ring 36, as shown in FIG. 2. Accordingly, gas within the main body 12 flows into the valve stem 34 through the gas inlet 34a and is ejected to the outside or a predetermined burner through the gas ejection passage 34b.

However, in a conventional aerosol vessel such as the portable gas vessel 10 shown in FIGS. 1 and 2, propellant gas stored in the aerosol vessel may easily expand or explode when a shock or heat is externally applied to the aerosol vessel. The explosion of an aerosol vessel may cause a fire and injury to human life.

In order to delay or prevent the explosion of an aerosol vessel, a top sealing cap and a bottom sealing cap are regulated to have a fold and a curve so that an extra space can be secured taking into account the expansion of propellant gas stored in the aerosol vessel. However, if the propellant gas continuously expands even after the top sealing cap and the bottom sealing cap are flattened or swollen making the inner volume of the aerosol vessel maximum, a portion where the top sealing cap or the bottom sealing cap is seamed to the main body of the aerosol vessel is unseamed, so the aerosol vessel explodes.

Another approach for preventing the deformation and explosion of an aerosol vessel by discharging gas from the aerosol vessel before the inner pressure of the aerosol vessel increases and reaches a deforming pressure is disclosed in Korean Utility Model Publication No. 99-3911 (published on Jan. 25, 1999), entitled "Pressure Vessel with Residual Gas Discharge Device". In this approach, a vessel includes a valve room with an inlet piercing through the side of the body of a valve assembly in a horizontal direction and a pressure application hole piercing through the bottom of the body of the valve assembly, a nozzle which is coupled with the upper portion of the valve room and forms a discharge passage communicating the valve room therebelow, and a plate valve which is received in the valve room such that it is elastically dropped down to be opened. According to the above structure, when the inner pressure of the vessel reaches a level at which contents cannot be discharged properly, the plate valve is opened making the inside of the vessel communicate with the outside, so residual gas can be discharged.

SUMMARY OF THE INVENTION

The invention provides an aerosol vessel which automatically discharges gas when the inner pressure thereof exceeds a predetermined value, thereby preventing deformation and explosion.

DISCLOSURE OF THE INVENTION

The invention further provides an aerosol vessel which discharges gas before the inner pressure thereof reaches a deforming pressure in order to prevent deformation and explosion, thereby improving reliability.

It is a second object of the present invention to provide an aerosol vessel which discharges gas before the inner pressure thereof reaches a deforming pressure in order to prevent deformation and explosion, thereby improving reliability.

The invention further provides an aerosol vessel which discharges gas before the inner pressure thereof reaches a deforming pressure in order to prevent deformation and explosion, thereby protecting property or human life from being damaged.

An aerosol valve assembly herein is provided in an aerosol vessel, which is hermetically sealed after being filled with contents and propellant gas and ejects the contents using a pressure of the propellant gas to apply the characteristics of the contents, for discharging the contents or stopping discharging. The aerosol valve assembly includes a support member which is coupled to a top portion of a main body of the aerosol vessel; a nozzle body which is fixed at the support member and whose top is opened, the nozzle body including a space, which communicates with the inside of the main body, and a support sill, which protrudes inward within the space; a valve stem which is installed in the space of the nozzle body, the valve stem including a gas inlet, through which gas within the space of the nozzle body flows into the valve stem, and a gas ejection passage, through which the gas flowing in through the gas inlet is ejected to the outside of the aerosol vessel; an opening/closing ring, which is installed such that it surrounds the outer circumference of the valve stem to open or close the gas inlet, contacts the support sill of the nozzle body, and is removably supported by the support sill; and an elastic unit for restoring the valve stem after operation and elastically supporting the opening/closing ring with respect to the support sill. When an excessive pressure occurs within the main body of the aerosol vessel, the opening/closing ring moves upward to discharge overcompressed gas.

An aerosol vessel of the invention includes the above-described aerosol valve assembly and an integral main body whose top is opened and whose bottom is hermetically sealed. The support member of the aerosol valve assembly is coupled to the top portion of the main body.

The aerosol vessel further includes the above-described aerosol valve assembly and a main body whose top is coupled with a top sealing cap and whose bottom is coupled with a bottom sealing cap. The support member of the aerosol valve assembly is coupled to the top sealing cap.

DETAILED DESCRIPTION OF THE INVENTION

Hereinafter, preferred embodiments of the present invention will be described in detail with reference to the attached drawings. For clarity of description, an aerosol vessel usually referred to as a portable gas vessel will be described as an embodiment, but it will be understood by those skilled in the art of the present invention that the present invention is not restricted thereto.

Figure 1:
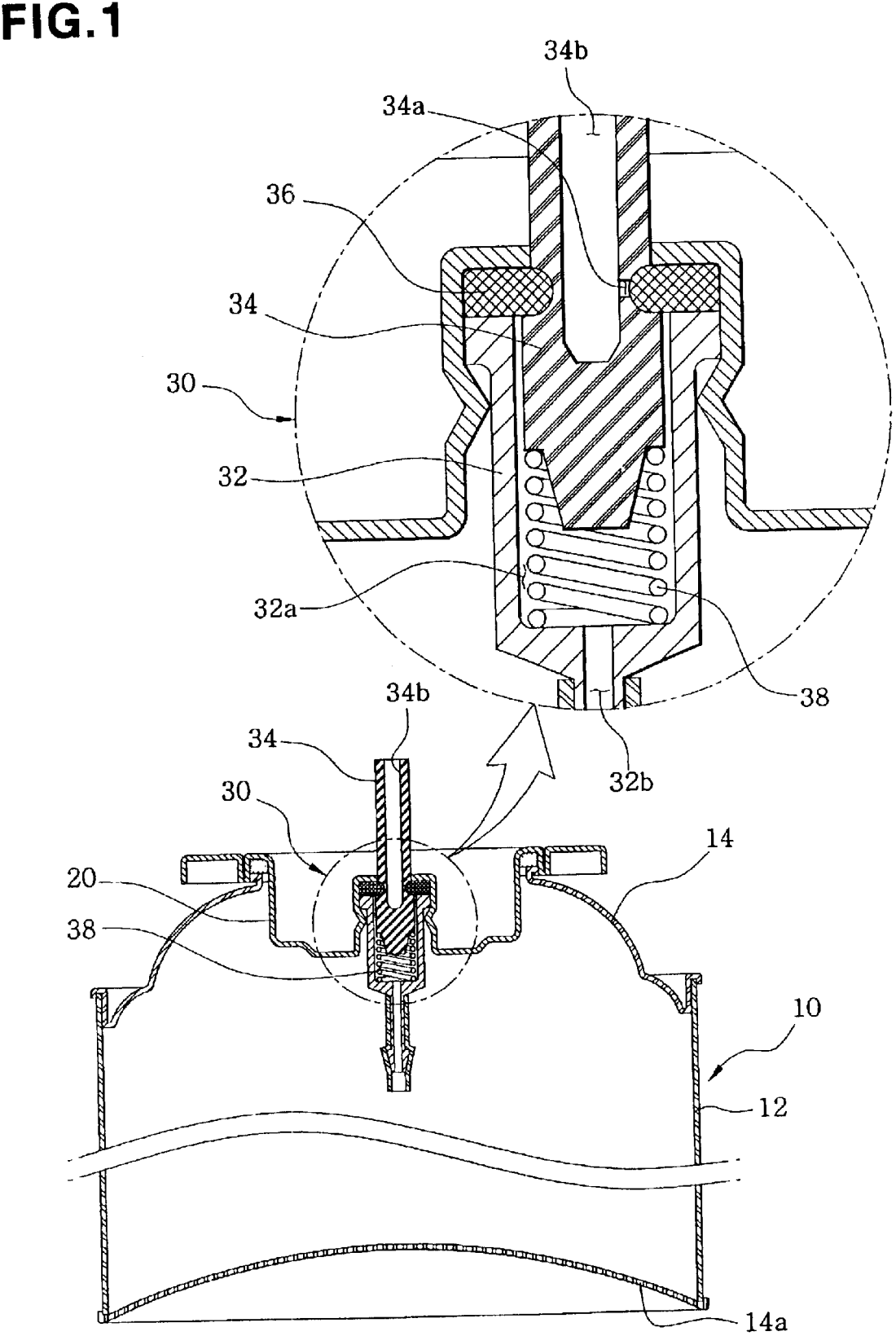
FIG. 1 is a vertical sectional view of an example of a conventional aerosol vessel.
Figure 2:
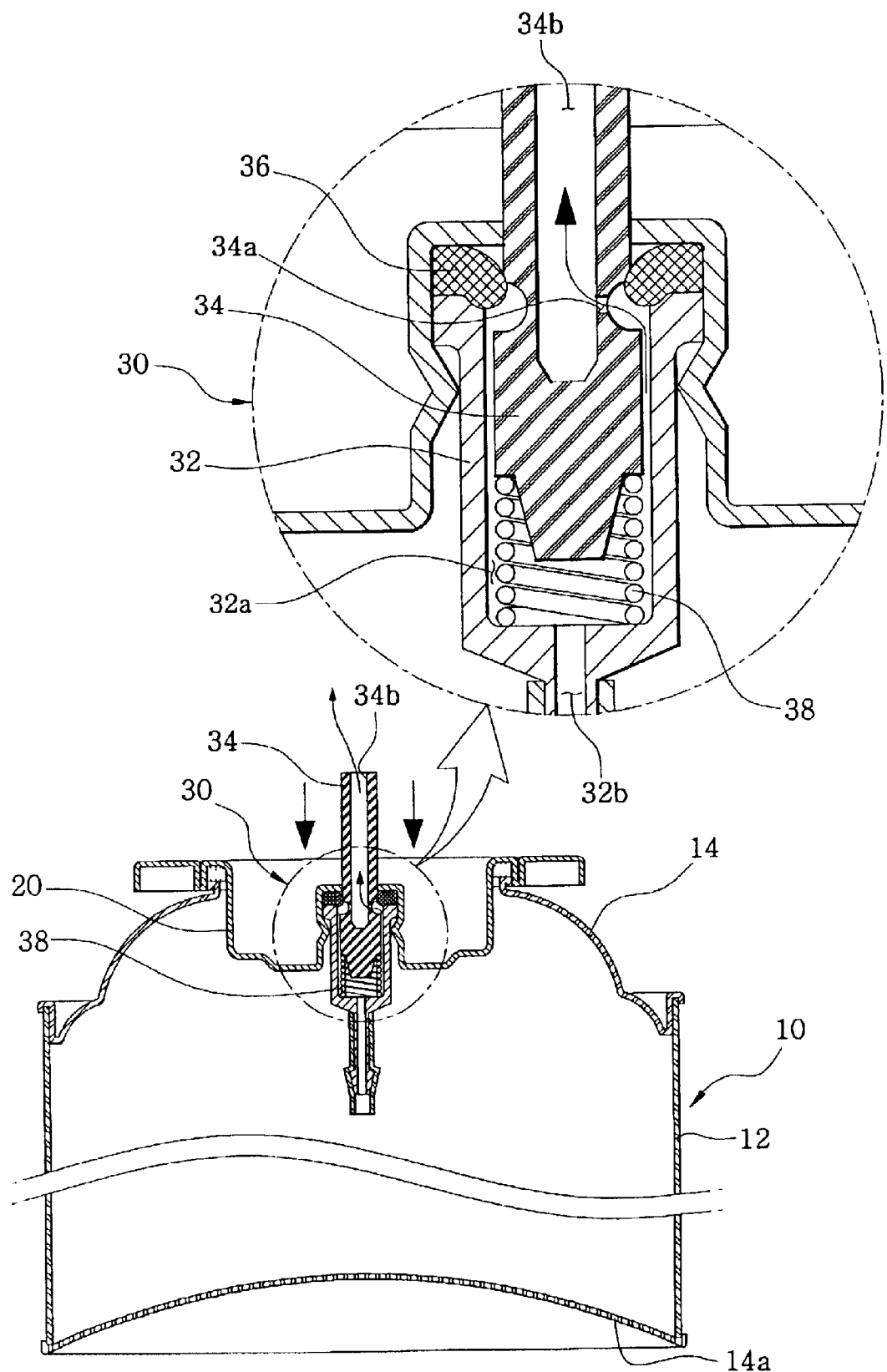
FIG. 2 is a vertical sectional view of a nozzle assembly while the aerosol vessel shown in FIG. 1 is being used.
Figure 3:
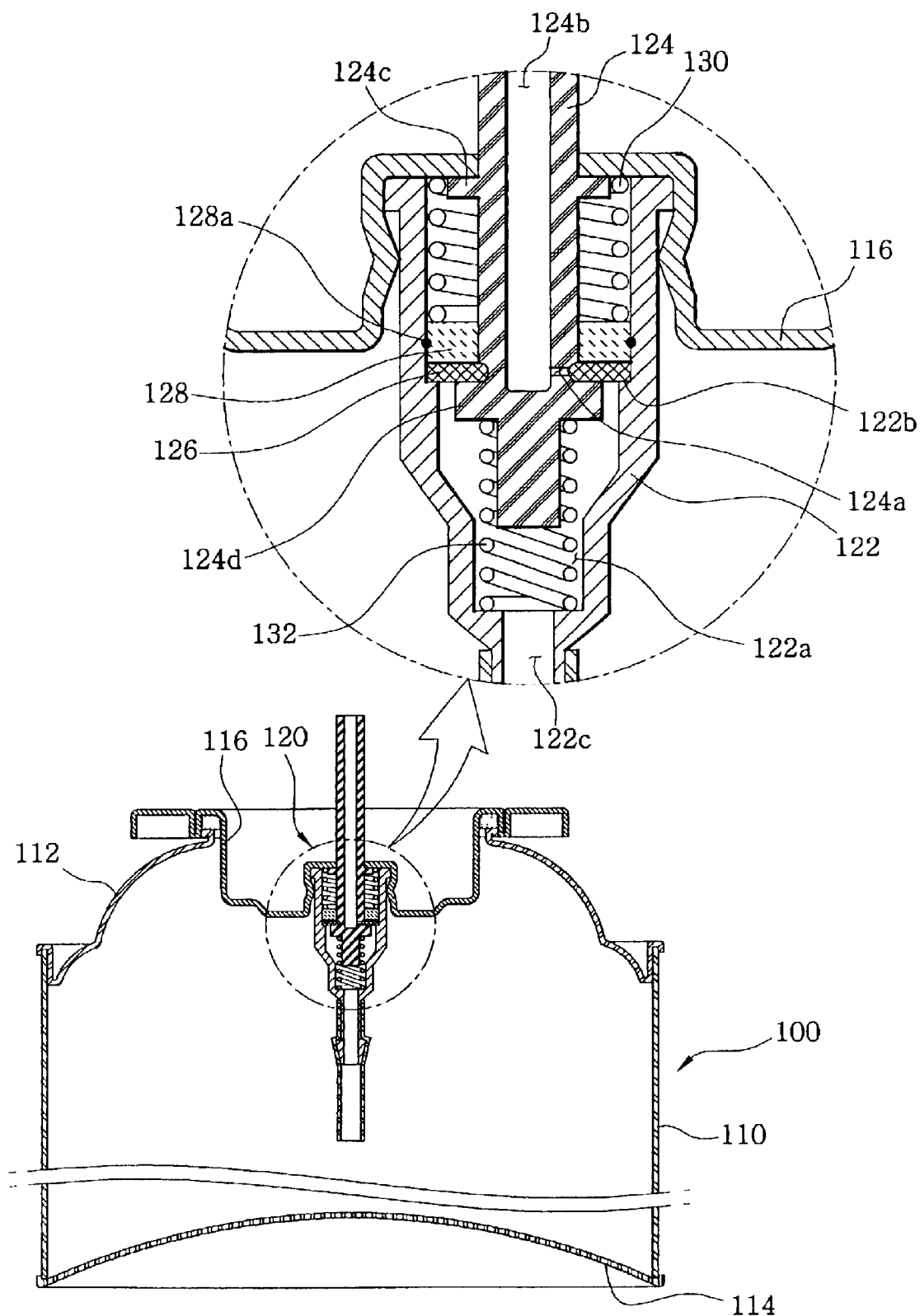
FIG. 3 is a vertical sectional view of a nozzle assembly of an aerosol vessel according to a first embodiment of the present invention.
Figure 4:
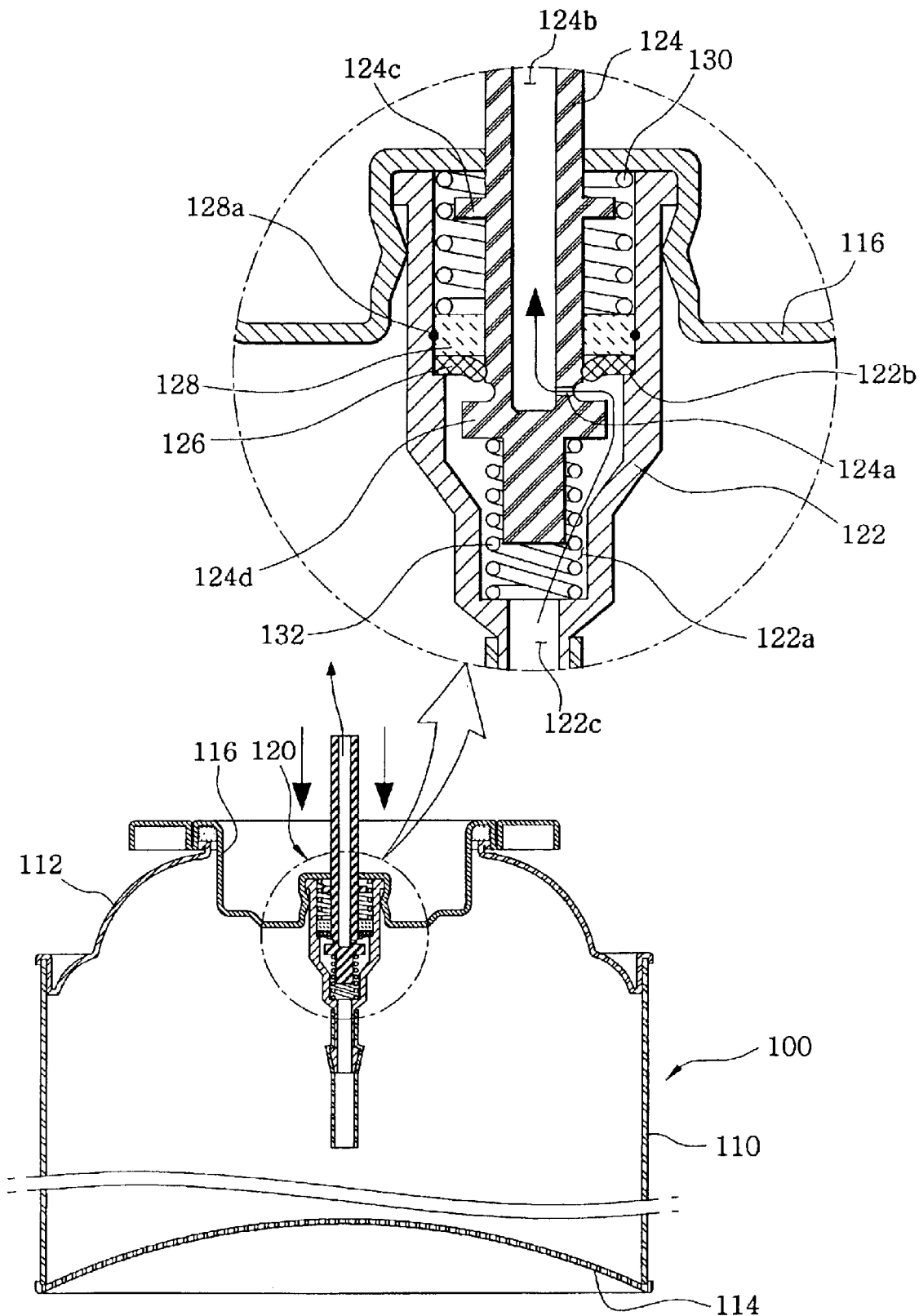
FIG. 4 is a vertical sectional view showing the operating state of the nozzle assembly when the aerosol vessel shown in FIG. 3 is used in a normal state.
Figure 5:
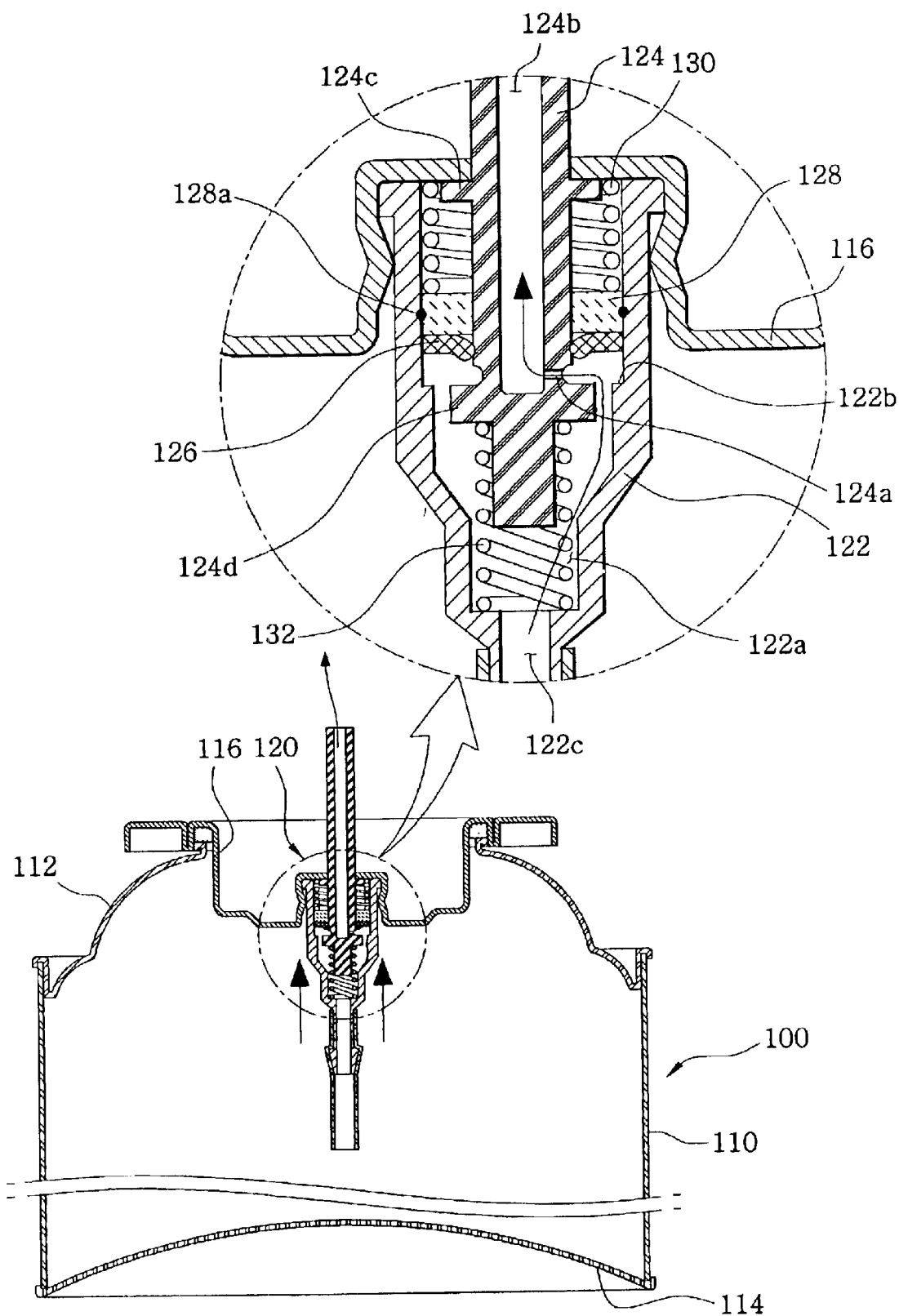
FIG. 5 is a vertical sectional view showing the operating state of the aerosol vessel shown in FIG. 3 when an excessive pressure occurs.

Referring to FIGS. 3 through 5, an aerosol vessel 100 according to a first embodiment of the present invention basically includes a main body 110. A top sealing cap 112 having a predetermined curve shape is seamed to the top of the main body 110. A bottom sealing cap 114 having an inwardly curved shape is seamed to the bottom of the main body 110. A support member 116 is compressively fixed at the center of the top sealing cap 112. A nozzle assembly 120 for ejecting gas is installed at the support member 116.

The nozzle assembly 120 according to the present invention is characterized by a structure for discharging gas either when the inner pressure of the main body 110 exceeds a predetermined value or when gas is produced within the main body 110.

More specifically, the nozzle assembly 120 includes a space 122a and a nozzle body 122 which is installed at the center of the support member 116 to be located within the main body 110. A support seal 122b is formed at the inside of the nozzle body 122. The top of the nozzle body 122 is opened, and a gas inflow passage 122c, which communicates with the inside of the main body 110, is formed in the lower portion of the nozzle body 122.

A valve stem 124 for ejecting gas from the main body 110 is installed in the space 122a of the nozzle body 122 such that it can move up and down. A gas inlet 124a, through which gas in the space of the nozzle body 122 flows, and a gas ejection passage 124b, through which gas flowing in through the gas inlet 124a is ejected to the outside, are formed in the valve stem 124. Here, the gas inlet 124 is formed at the lower portion of the valve stem 124 in a horizontal direction, and the gas ejection passage 124 is formed in the lengthwise direction of the valve stem 124 and communicates with the gas inlet 124a. A stopper 124c may be formed at the upper portion of the valve stem 124 such that it protrudes from the valve stem 124 in order to limit the upward motion of the valve stem 124. Usually a keeper 124d is protrudingly formed at the lower portion of the valve stem 124.

An opening/closing ring 126 is inserted between the nozzle body 122 and the valve stem 124 in order to open or close the gas inlet 124a depending on the up-and-down motion of the valve stem 124. Preferably, the opening/closing ring 126 is supported by the support sill 122b of the nozzle body 122 and is made of rubber having elasticity.

A contact member 128 for making the opening/closing ring 126 closely contact the support sill 122b may be mounted on the opening/closing ring 126. The contact member 128 forms a ring around the outer circumference of the valve stem 124. Preferably, the contact member 128 has a size corresponding to the size of the opening/closing ring 126. It is preferable that a sealing ring 128a is provided around the outer circumference of the contact member 128 for hermetically sealing between the contact member 128 and the inside of the nozzle body 122.

A contact spring 130 as an elastic member is installed on the opening/closing ring 126 or the contact member 128 in order to provide elasticity in a direction for making the opening/closing ring 126 closely contact the support sill 122b of the nozzle body 122. The contact spring 130 surrounds the outer circumference of the valve stem 124, contacts the contact member 128 at one side, and contacts the inside of the support member 116 at the other side such that it provides elasticity for making the contact member 128 and the opening/closing ring 126 closely contact the support sill 122b. Preferably, the elasticity is smaller than the deforming or explosion pressure of the main body 110, which occurs due to the expansion of propellant gas. Accordingly, when a pressure near the deforming pressure is produced in or applied to the main body 110, the contact spring 130 is compressed, and thus the gas inlet 124a, which has been closed by the opening/closing ring 126, is opened.

A support spring 132 for elastically supporting the valve stem 124 is installed in the lower portion of the space 122a of the nozzle body 122. The support spring 132 is compressed when the valve stem 124 is pressed down to eject gas to the outside, and is restored to an original position when pressure applied to the valve stem 124 is removed after ejection of gas.

Figure 6:
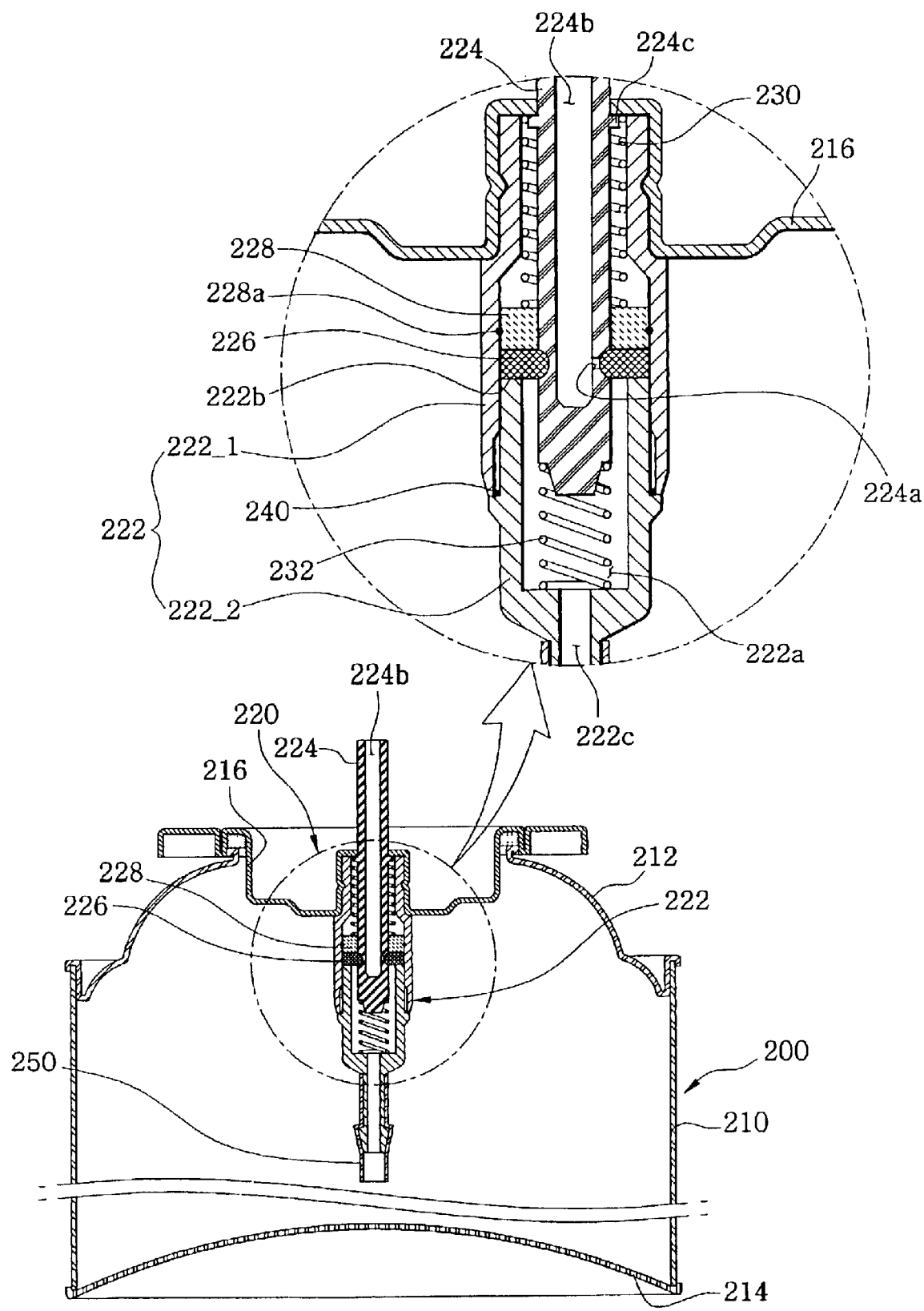
FIG. 6 is a vertical sectional view of an aerosol vessel according to a second embodiment of the present invention.
Figure 7:
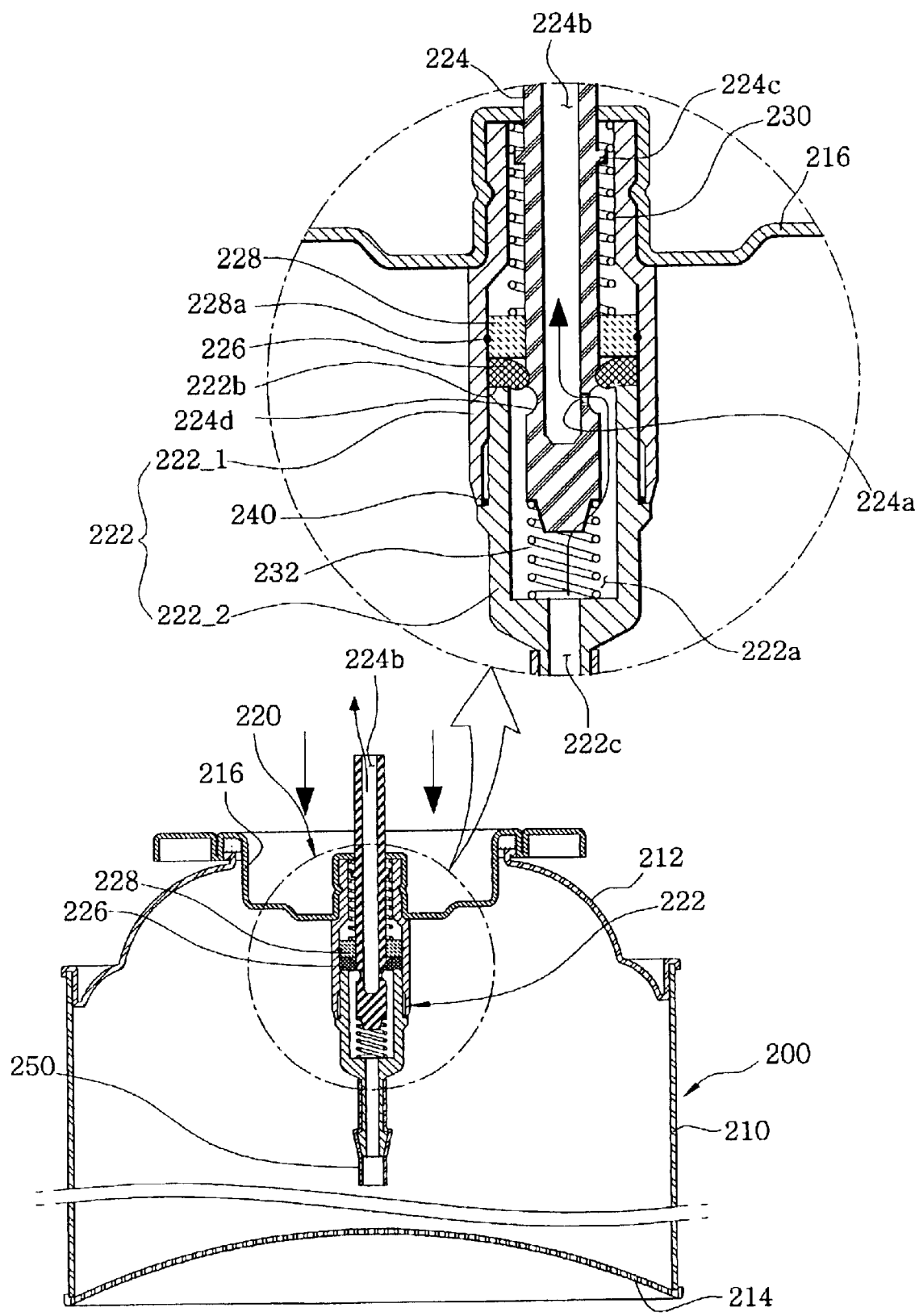
FIG. 7 is a vertical sectional view showing the operating state of the aerosol vessel shown in FIG. 6 in a normal state.
Figure 8:
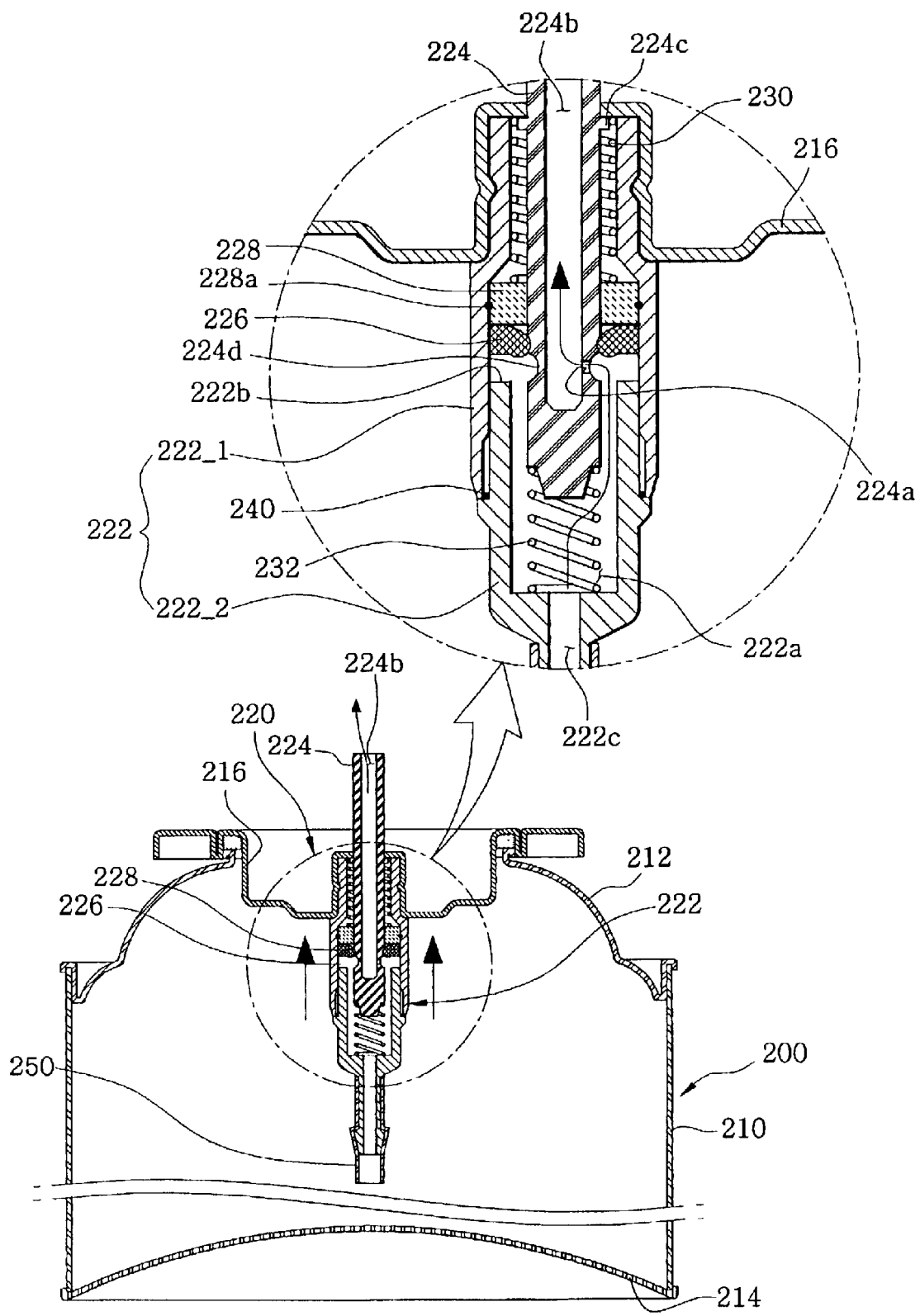
FIG. 8 is a vertical sectional view showing the operating state of the aerosol vessel shown in FIG. 6 when an excessive pressure occurs.

Referring to FIGS. 6 through 8, like the aerosol vessel 100 according to the first embodiment of the present invention, an aerosol vessel 200 according to a second embodiment of the present invention basically includes a main body 210. A top sealing cap 212 having a predetermined curve shape is seamed to the top of the main body 210. A bottom sealing cap 214 having an inwardly curved shape is seamed to the bottom of the main body 210. A support member 216 is compressively fixed at the center of the top sealing cap 212. A nozzle assembly 220 for ejecting gas is installed at the support member 216.

The nozzle assembly 220 is characterized by a structure for discharging gas stored within the main body 210 when the inner pressure of the main body 210 exceeds a predetermined value.

More specifically, the nozzle assembly 220 includes a nozzle body 222, which is installed at the center of the support member 216 to be located within the main body 210. Particularly, the nozzle body 222 includes an upper body 222_1 and a lower body 222_2, which together form a space 222a. The upper portion of the upper body 222_1 is fixed to the support member 216. The upper portion of the lower body 222_2 is inserted into the upper body 222_1, and the top of the lower body 222_2 forms a support seal 222b. A gas inflow passage 222c, which communicates with the inside of the main body 210 and into which gas stored in the main body 210 flows, is formed in the lower portion of the lower body 222_2.

A valve stem 224 for ejecting gas from the main body 210 is installed in the space 222a of the nozzle body 222 such that it can move up and down. A gas inlet 224a, through which gas in the space of the nozzle body 222 flows, and a gas ejection passage 224b, through which gas flowing in through the gas inlet 224a is ejected to the outside, are formed in the valve stem 224. Here, the gas inlet 224 is formed at the lower portion of the valve stem 224 in a horizontal direction, and the gas ejection passage 224 is formed in the lengthwise direction of the valve stem 224 and communicates with the gas inlet 224a. A stopper 224c may be formed at the upper portion of the valve stem 224 such that it protrudes from the valve stem 224 in order to limit the upward motion of the valve stem 224. A keeping groove 224d is formed at the lower portion of the valve stem 224. The keeping groove 224d communicates with the gas inlet 224a at one side.

An opening/closing ring 226 is inserted between the nozzle body 222 and the valve stem 224 in order to open or close the gas inlet 224a of the valve stem 224 depending on the up-and-down motion of the valve stem 224. Preferably, the opening/closing ring 226 is supported by the support sill 222b of the nozzle body 222 and is made of ring-shaped rubber having elasticity. The opening/closing ring 226 is removably inserted in the keeping groove 224d of the valve stem 224.

A contact member 228 for making the opening/closing ring 226 closely contact the support sill 222b may be mounted on the opening/closing ring 226 such that it surrounds the outer circumference of the valve stem 224. Preferably, the contact member 228 has a size corresponding to the size of the opening/closing ring 226. It is preferable that a sealing ring 228a made of rubber is provided around the outer circumference of the contact member 228 for hermetically sealing between the contact member 228 and the inside of the nozzle body 222.

A contact spring 230 is installed on the opening/closing ring 226 or the contact member 228 in order to provide elasticity in a direction for making the opening/closing ring 226 closely contact the support sill 222b of the nozzle body 222. The contact spring 230 surrounds the outer circumference of the valve stem 224, contacts the contact member 228 at one side, and contacts the inside of the support member 216 at the other side such that it provides elasticity for making the contact member 228 and the opening/closing ring 226 closely contact the support sill 222b. Preferably, the elasticity is smaller than the deforming or explosion pressure of the main body 210. Accordingly, when a pressure near the deforming pressure is produced in or applied to the main body 210, the contact spring 230 is compressed, and thus the gas inlet 224a, which has been closed by the opening/closing ring 226, is opened.

A support spring 232 for elastically supporting the valve stem 224 is installed in the lower portion of the space 222a of the nozzle body 222. The support spring 232 is compressed when the valve stem 224 is pressed down to eject gas to the outside, and restores the valve stem 224 to an original position when the valve stem 224 is released after ejection of gas.

It is preferable to provide a sealing ring 240 between the upper body 222_1 and the lower body 222_2 in order to keep the airtightness therebetween. In addition, an extra gas pipe 250 may be coupled with the gas inflow passage 222c in order to allow gas stored in the main body 210 to flow therein.

Figure 9:
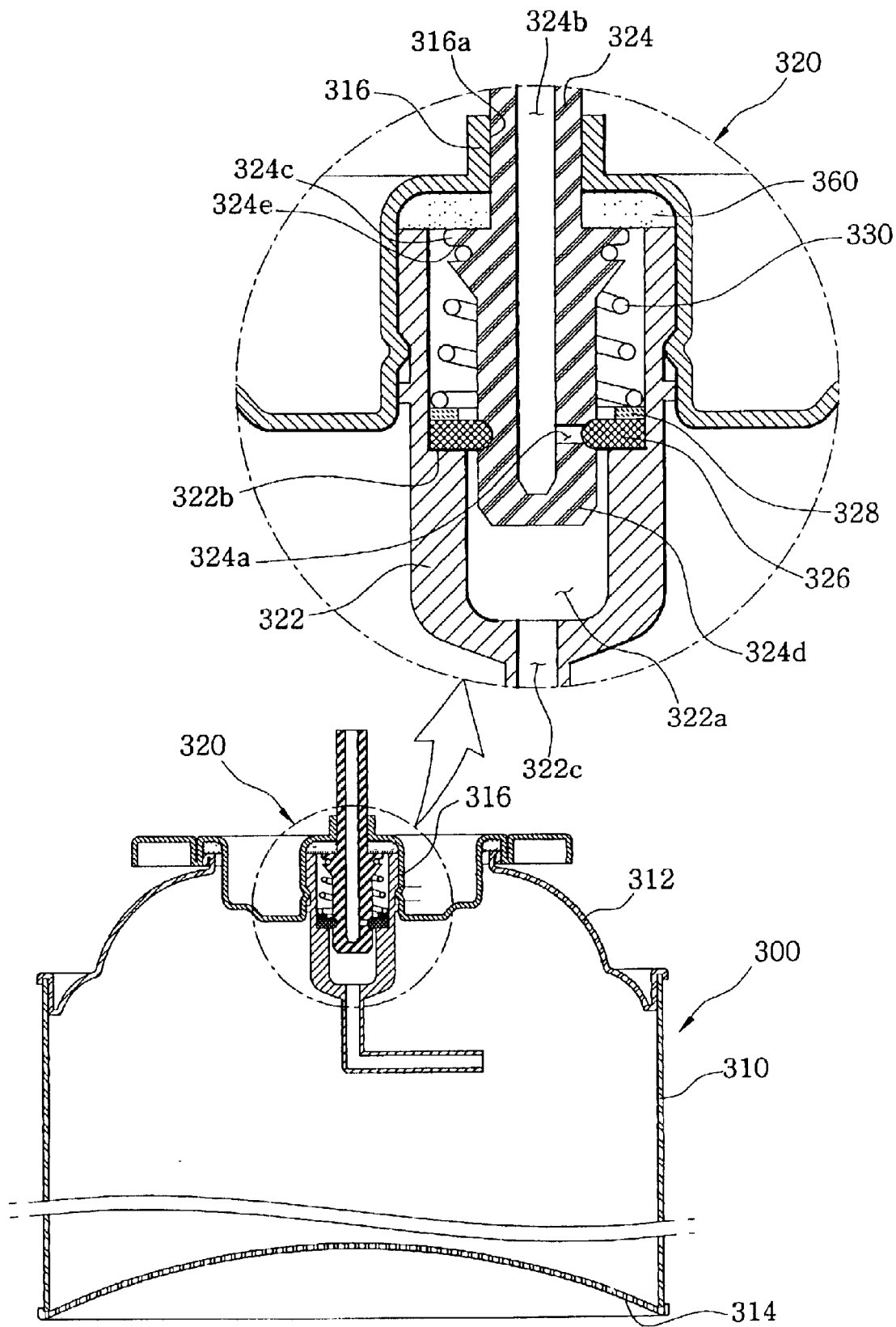
FIG. 9 is a vertical sectional view of an aerosol vessel according to a third embodiment of the present invention.
Figure 10:
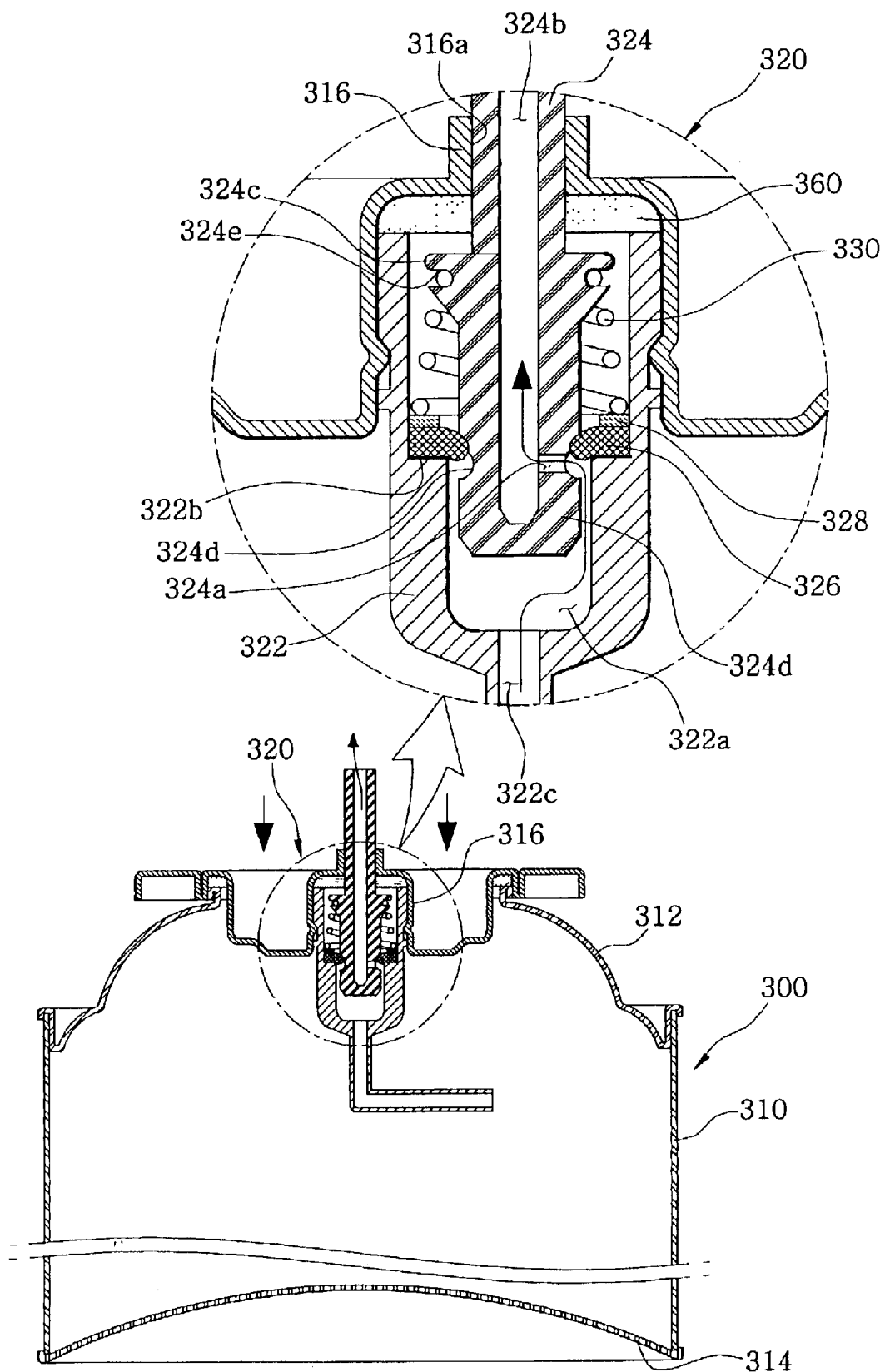
FIG. 10 is a vertical sectional view showing the operating state of the aerosol vessel shown in FIG. 9 in a normal state.
Figure 11:
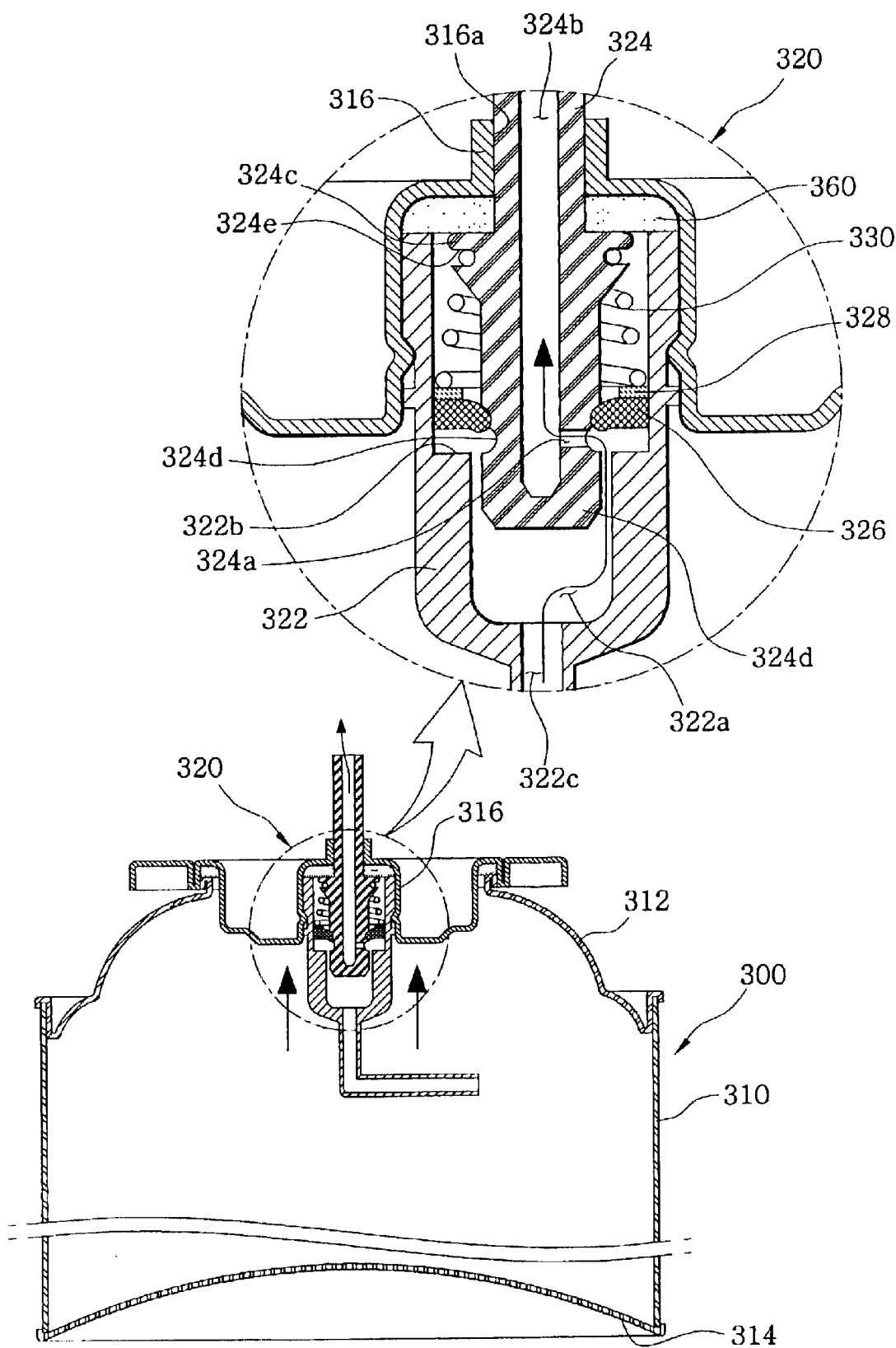
FIG. 11 is a vertical sectional view showing the operating state of the aerosol vessel shown in FIG. 9 when an excessive pressure occurs.

Referring to FIGS. 9 through 11, like the aerosol vessels 100 and 200 according to the first and second embodiments of the present invention, an aerosol vessel 300 according to a third embodiment of the present invention basically includes a main body 310. A top sealing cap 312 having a predetermined curve shape is seamed to the top of the main body 310. A bottom sealing cap 314 having an inwardly curved shape is seamed to the bottom of the main body 310. A support member 316 is compressively fixed at the center of the top sealing cap 312. A nozzle assembly 320 for ejecting gas is installed at the support member 316.

The nozzle assembly 320 basically includes a space 322a and a nozzle body 322, which is installed at the center of the support member 316 to be located within the main body 310.

A support seal 322b is formed at the inside of the nozzle body 322. The top of the nozzle body 322 is opened, and a gas inflow passage 322c, which communicates with the inside of the main body 310, is formed in the lower portion of the nozzle body 322.

A valve stem 324 for ejecting gas from the main body 310 is installed in the space 322a of the nozzle body 322 such that it can move up and down. A gas inlet 324a, through which gas in the space of the nozzle body 322 flows, and a gas ejection passage 324b, through which gas flowing in through the gas inlet 324a is ejected to the outside, are formed in the valve stem 324. Here, the gas inlet 324 is formed at the lower portion of the valve stem 324 in a horizontal direction, and the gas ejection passage 324 is formed in the lengthwise direction of the valve stem 324 and communicates with the gas inlet 324a. A stopper 324c may be formed at the upper portion of the valve stem 324 such that it protrudes from the valve stem 324 in order to limit the upward motion of the valve stem 324. A keeping groove 324d, which removably receives an opening/closing ring 326 therein and communicates with the gas inflow passage 324a, is formed at the lower portion of the valve stem 324. Preferably, a fixing groove 324e, in which one end of a contact spring 330 is fixed, is formed below the stopper 324c.

The opening/closing ring 326 is inserted between the nozzle body 322 and the valve stem 324 in order to open or close the gas inlet 324a of the valve stem 324 depending on the up-and-down motion of the valve stem 324. Preferably, the opening/closing ring 326 is supported by the support sill 322b of the nozzle body 322 and is made of ring-shaped rubber having elasticity.

A contact member 328 for making the opening/closing ring 326 closely contact the support sill 322b may be mounted on the opening/closing ring 326 such that it surrounds the outer circumference of the valve stem 324. Preferably, the contact member 328 has a size corresponding to the size of the opening/closing ring 326.

The contact spring 330 is installed on the opening/closing ring 326 or the contact member 328 in order to provide elasticity in a direction for making the opening/closing ring 326 closely contact the support sill 322b of the nozzle body 322 and to apply elasticity to the valve stem 324. The contact spring 330 is installed such that it surrounds the outer circumference of the valve stem 324. The bottom end of the contact spring 330 contacts the contact member 328, and the top end thereof is fixed in the fixing groove 324e below the stopper 324c of the valve stem 324, such that the contact spring 330 provides elasticity between the contact member 328 and the stopper 324c. Preferably, the elasticity is smaller than the deforming or explosion pressure of the main body 310. Accordingly, when a pressure near the deforming pressure is produced in or applied to the main body 310, the contact spring 330 is compressed, and thus the gas inlet 324a, which has been closed by the opening/closing ring 326, is opened.

A sealing ring 360 may be installed above the stopper 324c of the valve stem 324. The sealing ring 360 provides airtightness between the inside of the support member 316 and the top surface of the stopper 124c of the valve stem 324 so that leakage of gas stored in the main body 310 can be prevented.

Figure 12:
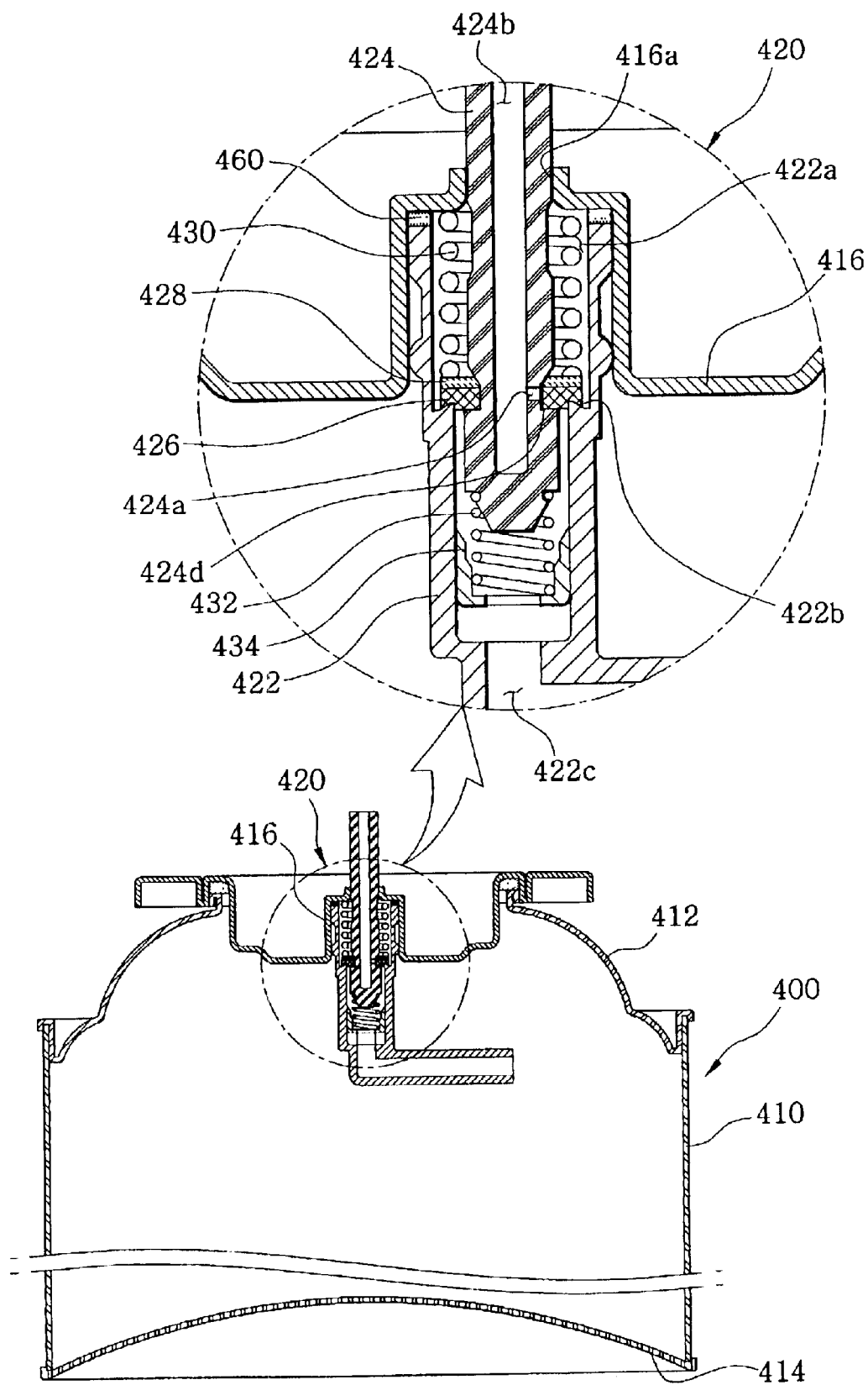
FIG. 12 is a vertical sectional view of an aerosol vessel according to a fourth embodiment of the present invention.
Figure 13:
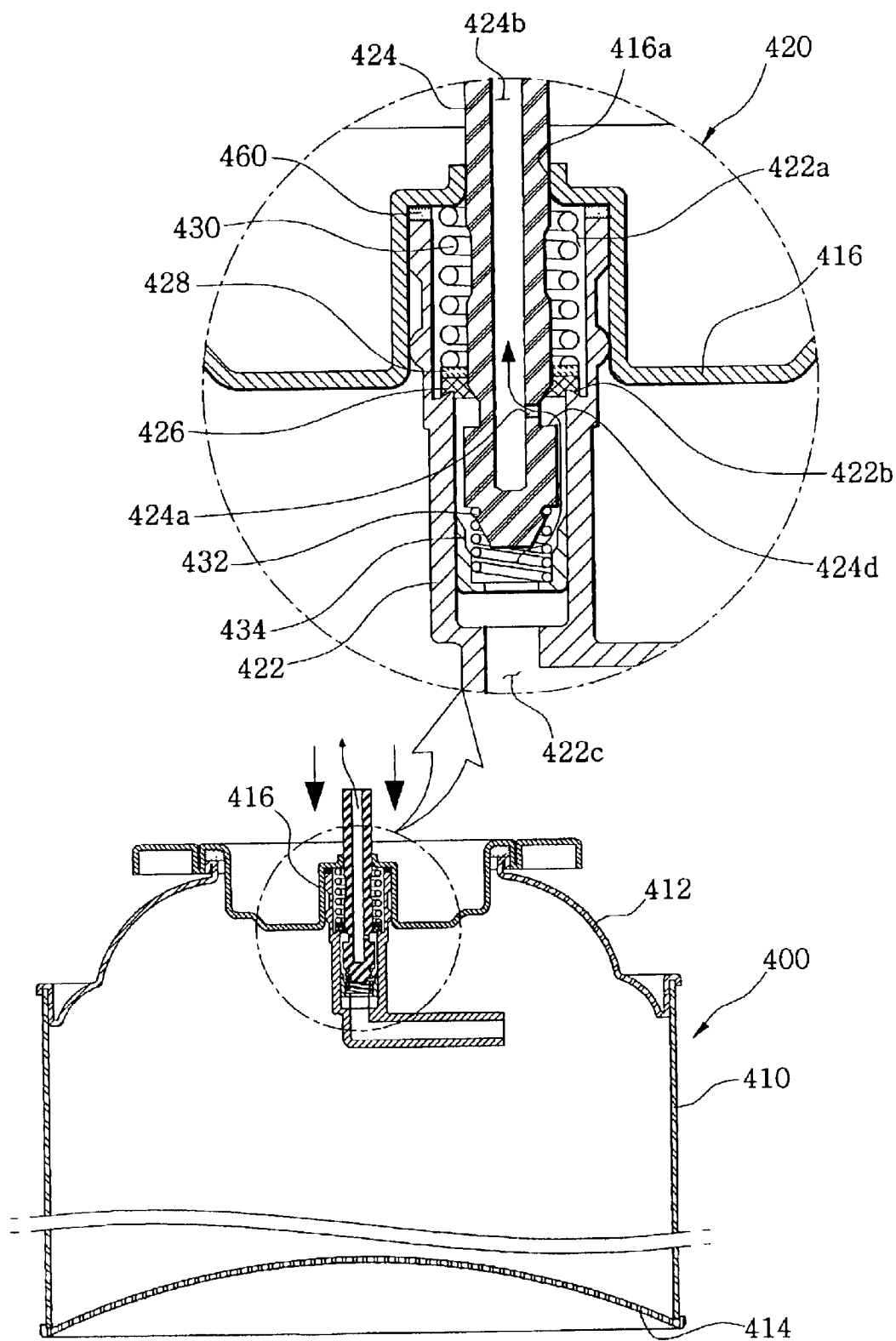
FIG. 13 is a vertical sectional view showing the operating state of the aerosol vessel shown in FIG. 12 in a normal state.
Figure 14:
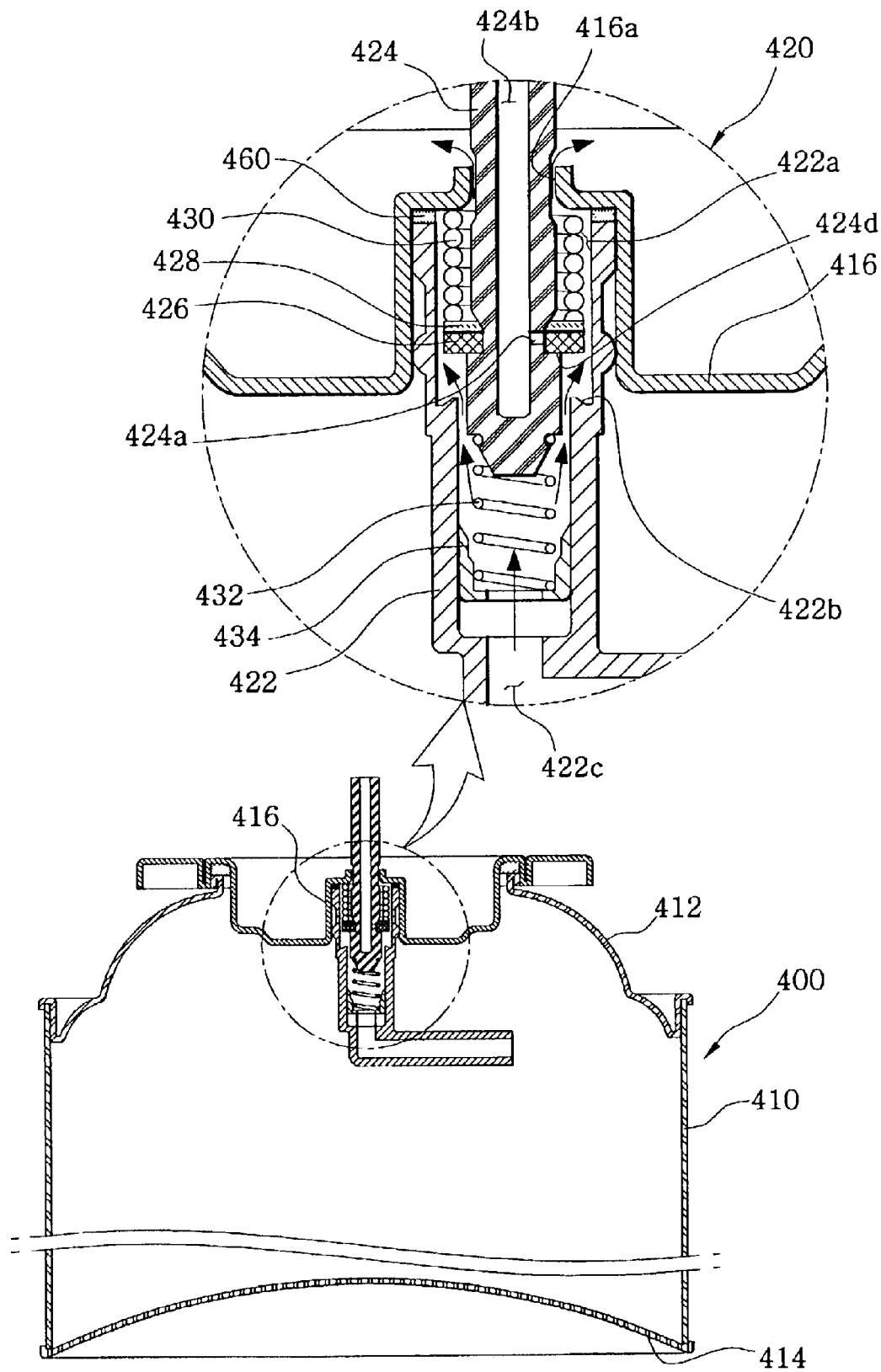
FIG. 14 is a vertical sectional view showing the operating state of the aerosol vessel shown in FIG. 12 when an excessive pressure occurs.

Referring to FIGS. 12 through 14, like the aerosol vessels 100, 200, and 300 according to the first through third embodiments of the present invention, an aerosol vessel 400 according to a fourth embodiment of the present invention basically includes a main body 410. A top sealing cap 412 having a predetermined curve shape is seamed to the top of the main body 410. A bottom sealing cap 414 having an inwardly curved shape is seamed to the bottom of the main body 410. A support member 416 is compressively fixed at the center of the top sealing cap 412. A nozzle assembly 420 for ejecting gas is installed at the support member 416.

The nozzle assembly 420 includes a space 422a and a nozzle body 422, which is supported by the support member 416 to be located within the main body 410. A support seal 422b, which contacts an opening/closing ring 426, is formed at the inside of the nozzle body 422. The top of the nozzle body 422 is opened, and a gas inflow passage 422c, which communicates with the inside of the main body 410, is formed in the lower portion of the nozzle body 422.

A valve stem 424 for ejecting gas from the main body 410 is installed in the space 422a of the nozzle body 422 such that it can move up and down. The valve system 424 pierces through an opening portion 416a of the support member 416 and is supported by the support member 416. A gas inlet 424a, through which gas in the space of the nozzle body 422 flows, and a gas ejection passage 424b, through which gas flowing in through the gas inlet 424a is ejected to the outside, are formed in the valve stem 424. Here, the gas inlet 424 is formed at the lower portion of the valve stem 424 in a horizontal direction, and the gas ejection passage 424 is formed in the lengthwise direction of the valve stem 424 and communicates with the gas inlet 424a. A keeping groove 424d, which communicates with the gas inlet 424a, is formed at a proper position, i.e., a position where the gas inlet 424a is formed, in the valve stem 424.

The opening/closing ring 426 is inserted between the nozzle body 422 and the valve stem 424 in order to open or close the gas inlet 424a of the valve stem 424 depending on the up-and-down motion of the valve stem 424. Preferably, the opening/closing ring 426 is removably inserted between the nozzle body 422 and the keeping groove 424d of the valve stem 424 and is made of ring-shaped rubber having elasticity.

A contact member 428 for making the opening/closing ring 426 closely contact the support sill 422b of the nozzle body 422 during an idle state, i.e., a non-use state, may be mounted on the opening/closing ring 426 such that it surrounds the outer circumference of the valve stem 424. The contact member 428 may be formed in a variety of sizes corresponding to the size of the opening/closing ring 426.

The contact spring 430 is installed on the opening/closing ring 426 or the contact member 428 in order to provide elasticity in a direction for making the opening/closing ring 426 closely contact the support sill 422b of the nozzle body 422. The contact spring 430 is installed such that it surrounds the outer circumference of the valve stem 424. The bottom end of the contact spring 430 contacts the contact member 428, and the top end thereof contacts the inside of the support member 416, such that the contact spring 430 provides elasticity between the contact member 428 and the support member 416. Preferably, the elasticity is smaller than the deforming or explosion pressure of the main body 410. Accordingly, when a pressure near the deforming pressure is produced in or applied to the main body 410, the contact spring 430 is compressed, and thus the opening/closing ring 426 is separated from the nozzle body 422. Consequently, as shown in FIG. 14, some of the gas stored in the main body 410 escapes through the gap formed between the support member 416 and the valve stem 424.

A support spring 432 for elastically support the valve stem 424 is installed in the lower portion of the space 422a of the nozzle body 422. The bottom end of the support spring 432 is supported by a supporter 434, which is fixed at the bottom of the space 422a of the nozzle body 422. The support spring 432 is compressed when the valve stem 424 is pressed down to eject gas to the outside, and is restored to an original position when pressure applied to the valve stem 424 is removed after ejection of gas.

Preferably, a seal 460 is inserted between the inside of the support member 416 and the top surface of the nozzle body 422 in order to prevent abrasion and leak, which may occur due to the direct contact between the support member 416 and the top surface of the nozzle body 422.

Figure 15:
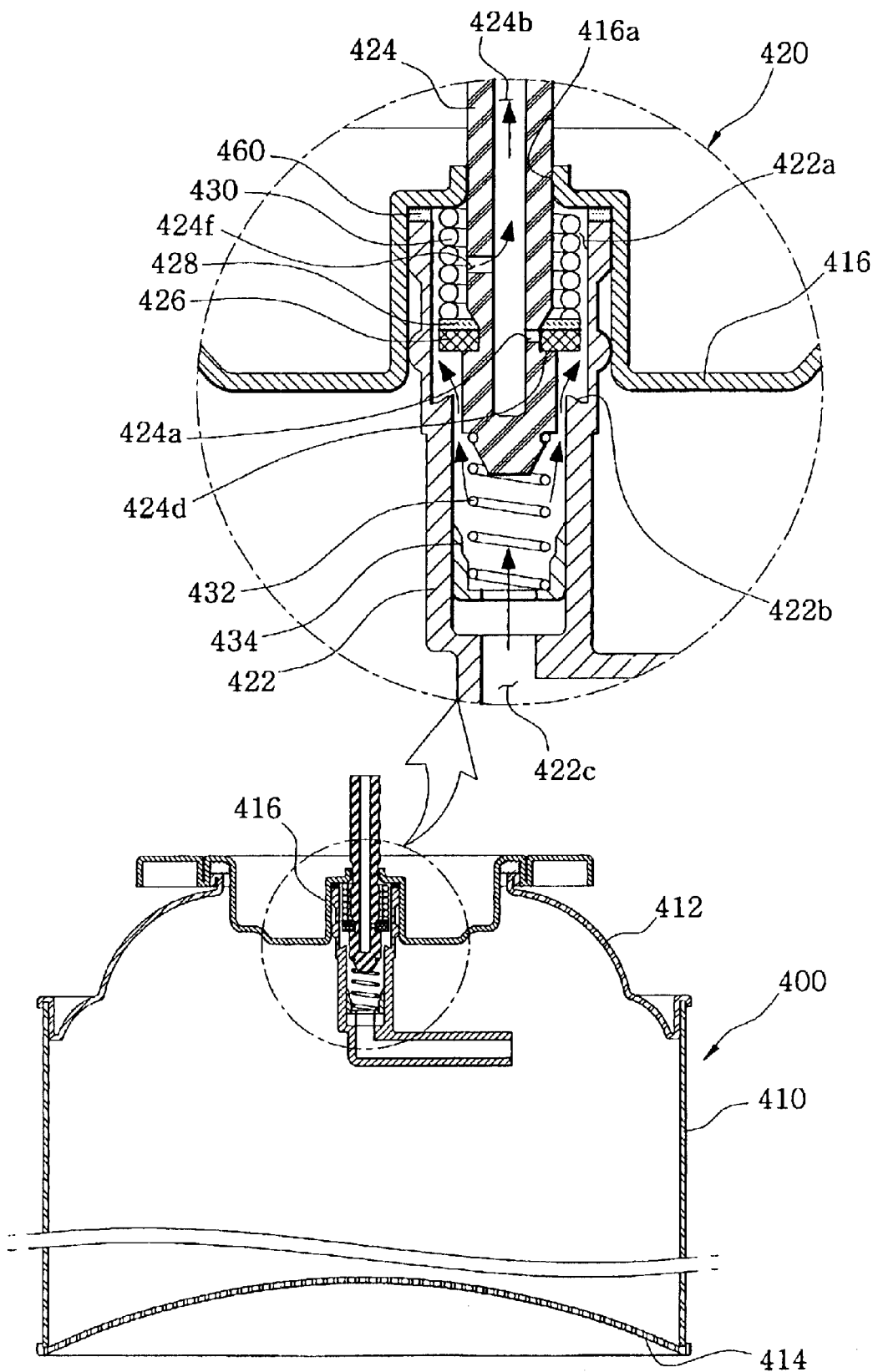
FIG. 15 is a vertical sectional view showing the operating state of an aerosol vessel according to a fifth embodiment of the present invention when an excessive pressure occurs.

FIG. 15 shows an aerosol vessel 500 which is a modified embodiment of the aerosol vessel 400 according to the fourth embodiment shown in FIGS. 12 through 14. Referring to FIG. 15, the aerosol vessel 500 according to a fifth embodiment of the present invention is basically the same as the aerosol vessel 400 according to the fourth embodiment of the present invention. However, the aerosol vessel 500 further includes a gas outlet 424f at an appropriate position of the valve stem 424 in the nozzle assembly 420 in order to discharge overcompressed gas either when an excessive pressure is formed within the main body 410 or when gas is produced in the main body 410. In other words, the gas outlet 424f is formed above the gas inlet 424a in the valve stem 424 such that it communicates with the gas ejection passage 424b.

In the above description, the aerosol vessels according to the first through fifth embodiments of the present invention have a three-piece structure in which a top sealing cap having a predetermined curve shape is seamed to the top of a main body, and a bottom sealing cap having an inwardly curved shape is seamed to the bottom of the main body. However, an aerosol vessel according to the present invention is not restricted thereto. It will be easily understood by one of ordinary skill in the art of the present invention that the top and bottom sealing caps and the main body may be integrated in one body.

Hereinafter, the operations and effects of the embodiments of the present invention will be described in detail.

In the aerosol vessel 100 according to the first embodiment, the valve stem 124 of the nozzle assembly 120 is maintained in a state as shown in FIG. 3 when it is not in use. In this state, the gas inlet 124a of the valve stem 124 is maintained closed by the opening/closing ring 126.

When the aerosol vessel 100 is installed in a compatible device such as a portable gas burner and a switch of the device is turned on, is the valve stem 124 of the nozzle assembly 120 moves down, as shown in FIG. 4. When the valve stem 124 moves down, gas stored in the main body 110 flows into the space 122a of the nozzle body 122 through the gas inflow passage 122c. Thereafter, the gas passes the gas inlet 124b and is discharged outside or provided to the device through the gas ejection passage 124b. Thereafter, when the use of the aerosol vessel 100 is completed or removed from the device, the valve stem 124 is restored to an original position by the elasticity of the support spring 132 and is maintained in the non-use state, as shown in FIG. 3.

In the meantime, when an excessive pressure is formed within the main body 110 due to an external pressure or heat in the non-use state of the aerosol vessel 100, some of the gas is discharged from the main body 110. In other words, when the inner pressure of the main body 110 exceeds the maximum tension of the contact spring 130, which is set based on the deforming or explosion pressure of the aerosol vessel 100, the gas inlet 124a of the valve stem 124 is opened so that overcompressed gas is discharged, thereby preventing the explosion or deformation of the aerosol vessel 100.

More specifically, when the inner pressure of the main body 110 exceeds a set value, the opening/closing ring 126 and the contact member 128 are moved upward by the pressure of gas which flows into the space 122a of the nozzle body 122 of the nozzle assembly 120, and simultaneously, the contact spring 130 is compressed, opening the gas inlet 124a, as shown in FIG. 5. Accordingly, overcompressed gas within the main body 110 passes through the gas inlet 124a of the valve stem 124 and is discharged through the gas ejection passage 124b. Thereafter, if the inner pressure of the main body 110 is restored to a normal state due to the discharge of overcompressed gas, the contact member 128 and the opening/closing ring 126 are moved downward by the tension of the contact spring 130, and thus the opening/closing ring 126 closes the gas inlet 124a of the valve stem 124, so that the aerosol vessel 100 is maintained in the normal state shown in FIG. 3. Consequently, when a pressure exceeding a set value occurs within the main body 110, valve stem 124 automatically operates to discharge overcompressed gas so that the inner pressure of the aerosol vessel 100 can always be maintained in the normal state.

Since the aerosol vessel 200 according to the second embodiment of the present invention operates in the similar manner to the first embodiment, it will be described briefly.

As shown in FIG. 6, when the aerosol vessel 200 is not in use, the valve stem 224 of the nozzle assembly 220 is maintained such that the gas inlet 224a is closed by the opening/closing ring 226. In this state, when the valve stem 224 of the nozzle assembly 220 is moved downward, as shown in FIG. 7, to use the aerosol vessel 200, gas stored in the main body 210 is ejected outside through the gas inflow passage 222c of the nozzle body 222, which is composed of the upper body 222_1 and the lower body 222_2, and the gas inlet 224a and the gas ejection passage 224b of the valve stem 224. When the use of the aerosol vessel 200 is completed, the valve stem 224 is restored to an original position by the support spring 232 and is maintained in a non-use state, as shown in FIG. 6.

When the inner pressure of the main body 210 exceeds a set value in a state in which the aerosol vessel 200 is not in use as shown in FIG. 6, the opening/closing ring 226 and the contact member 228 are moved upward by the pressure of gas which flows into the space 222a of the nozzle body 222 of the nozzle assembly 220, and simultaneously, the contact spring 230 is compressed, opening the gas inlet 224a, as shown in FIG. 8. Accordingly, overcompressed gas within the main body 210 is discharged through the gas ejection passage 224b. Thereafter, if the inner pressure of the main body 210 is restored to a normal state, the contact member 228 and the opening/closing ring 226 are moved downward by the tension of the contact spring 230, and thus the opening/closing ring 226 closes the gas inlet 224a of the valve stem 224, so that the aerosol vessel 200 is restored to a normal state. Consequently, when a pressure exceeding a set value occurs within the main body 210, valve stem 224 automatically operates to discharge overcompressed gas so that the inner pressure of the aerosol vessel 200 can always be maintained in the normal state.

Since the aerosol vessel 300 according to the third embodiment of the present invention operates in the similar manner to the first embodiment, it will be described briefly.

As shown in FIG. 9, when the aerosol vessel 300 is not in use, the valve stem 324 of the nozzle assembly 320 is maintained such that the gas inlet 324a is closed by the opening/closing ring 326. In this state, when the valve stem 324 of the nozzle assembly 320 is moved downward, as shown in FIG. 10, to use the aerosol vessel 300, gas stored in the main body 310 is ejected outside through the gas inflow passage 322c of the nozzle body 322, and the gas inlet 324a and the gas ejection passage 324b of the valve stem 324. When the use of the aerosol vessel 300 is completed, the valve stem 324 is restored to an original position by the contact spring 330 and is maintained in a non-use state, as shown in FIG. 9.

When the inner pressure of the main body 310 exceeds a set value in a state in which the aerosol vessel 300 is not in use as shown in FIG. 9, the opening/closing ring 326 and the contact member 328 are moved upward by the pressure of gas which flows into the space 322a of the nozzle body 322 of the nozzle assembly 320, and simultaneously, the contact spring 330 is compressed, opening the gas inlet 324a, as shown in FIG. 11. Accordingly, overcompressed gas within the main body 310 is discharged through the gas ejection passage 324b. Thereafter, if the inner pressure of the main body 310 is restored to a normal state, the contact member 328 and the opening/closing ring 326 are moved downward by the tension of the contact spring 330, and thus the opening/closing ring 326 closes the gas inlet 324a of the valve stem 324, so that the aerosol vessel 300 is restored to a normal state. Consequently, when a pressure exceeding a set value occurs within the main body 310, valve stem 324 automatically operates to discharge overcompressed gas so that the inner pressure of the aerosol vessel 300 can always be maintained in the normal state.

When the aerosol vessel 400 according to the fourth embodiment is not in use, the valve stem 424 of the nozzle assembly 420 is maintained in a state as shown in FIG. 12. In other words, the gas inlet 424a of the valve stem 424 is maintained closed by the opening/closing ring 426. In addition, the opening/closing ring 426 is compressed by the contact spring 430 such that it closely contacts the support sill 422b of the nozzle body 422 so as to prevent the discharge of gas When the valve stem 424 of the nozzle assembly 420 is moved down to eject the gas stored in the aerosol vessel 400, as shown in FIG. 13, the gas stored in the main body 410 flows into the space 422a of the nozzle body 422 through the gas inflow passage 422c. Thereafter, the gas passes the gas inlet 424b and is discharged outside through the gas ejection passage 424b. Thereafter, when the use of the aerosol vessel 400 is completed, the valve stem 424 is restored to an original position by the elasticity of the support spring 432 and is maintained in the non-use state, as shown in FIG. 12.

In the meantime, when an excessive pressure is spontaneously formed within the main body 110 or due to an external pressure when the aerosol vessel 400 is not in use, as shown in FIG. 12, some of the gas is discharged from the main body 410. In other words, when the inner pressure of the main body 410 exceeds the maximum tension of the contact spring 430, which is set based on the deforming or explosion pressure of the aerosol vessel 400, the valve stem 424 moves upward separating the opening/closing ring 426 from the support sill 422b of the nozzle body 422 so that overcompressed gas is discharged from the main body 410, thereby preventing the explosion or deformation of the aerosol vessel 400.

More specifically, when an excessive pressure occurs in the main body 410, the contact spring 430 is compressed by the pressure of gas, which flows in the space 422a of the nozzle body 422 of the nozzle assembly 420, moving the valve stem 424 together with the opening/closing ring 426 and the contact member 428, as shown in FIG. 14. When the opening/closing ring 426 is separated from the support sill 422b of the nozzle body 422, overcompressed gas escapes through the gap between the opening/closing ring 426 and the support sill 422b and is discharged through a gap (a discharge gap) between the valve stem 424 and the opening portion 416a of the support member 416. Thereafter, when the inner pressure of the main body 410 is restored to a normal state after the overcompressed gas is discharged, the valve stem 424, the contact member 428, and the opening/closing ring 426 are moved downward by the tension of the contact spring 430, making the opening/closing ring 426 contacting the support sill 422b of the nozzle body 422. As a result, the aerosol vessel 400 can be maintained in a normal non-use state, as shown in FIG. 12.

According to the fifth embodiment of the present invention shown in FIG. 15, when an excessive pressure occurs in the main body 410, the contact spring 430 is compressed by the pressure of gas, which flows in the space 422a of the nozzle body 422 of the nozzle assembly 420, moving the valve stem 424 together with the opening/closing ring-426 and the contact member 428. When the opening/closing ring 426 is separated from the support sill 422b of the nozzle body 422, overcompressed gas escapes through the gap between the opening/closing ring 426 and the support sill 422b, flows into the gas ejection passage 424b through the gas outlet 424f of the valve stem 424, and is discharged through the gas ejection passage 424b. Thereafter, when the inner pressure of the main body 410 is restored to a normal state after the overcompressed gas is discharged, the valve stem 424, the contact member 428, and the opening/closing ring 426 are moved downward by the tension of the contact spring 430, making the opening/closing ring 426 contacting the support sill 422b of the nozzle body 422. As a result, the aerosol vessel 400 according to the fifth embodiment can be maintained in a normal non-use state, as shown in FIG. 12.

Consequently, when a pressure exceeding a set value occurs in the main body 410, the valve stem 424 automatically operates to discharge overcompressed gas so that the inner value of the aerosol vessel 400 can always be maintained in a normal state.

Here, the set value is based on a deforming pressure of 13 kg/cm$^2$ and an explosion pressure of 15 kg/cm$^2$, which are applied in Korea. However, it will be understood that the set value may be different depending on the type and usage of a vessel.

While this invention has been particularly shown and described with reference to preferred embodiments thereof, it will be understood by those skilled in the art that various changes may be made therein without departing from the scope of the invention. Therefore, the above-described embodiments will be considered not in restrictive sense but in descriptive sense only. The scope of the invention will be defined not by the above description but by the appended claims, and it will be construed that all differences made within the scope defined by the claims are included in the present invention.

INDUSTRIAL APPLICABILITY

According to the present invention, when a pressure exceeding a set value occurs in a main body due to an external pressure or heat, which is applied to an aerosol vessel, a valve system automatically operates to discharge high-pressure gas, thereby preventing the deformation or explosion of the aerosol vessel.

Since gas is ejected before the inner pressure of the aerosol vessel reaches a deforming pressure, the inner pressure of the aerosol vessel can be maintained constant. In addition, the deformation and explosion of the aerosol vessel can be prevented, thereby protecting property or human life from being damaged.

While this invention has been particularly shown and described with reference to preferred embodiments thereof, it will be understood by those skilled in the art that various changes may be made therein without departing from the scope of the invention. Therefore, the above-described embodiments will be considered not in restrictive sense but in descriptive sense only. The scope of the invention will be defined not by the above description but by the appended claims, and it will be construed that all differences made within the scope defined by the claims are included in the present invention.

What is claimed is:

1. An aerosol valve assembly for an aerosol vessel filled with contents and propellant gas, for discharging the contents or stopping discharging, the aerosol valve assembly comprising:

a support member coupled to a top portion of a main body of the aerosol vessel;

a nozzle body fixed at the support member, including an opened end, a space communicating with an inside of the main body, and a support sill protruding into the space;

a valve stem disposed in the space of the nozzle body, the valve stem comprising a gas inlet through which gas within the space of the nozzle body flows into the valve stem, and a gas ejection passage through which the gas flowing in through the gas inlet is ejected to an outside of the aerosol vessel;

an opening/closing ring surrounding an outer circumference of the valve stem to open or close the gas inlet, the opening/closing ring contacting the support sill of the nozzle body and being removably supported by the support sill; and elastic means for restoring die valve stem after an operation of the assembly and elastically supporting the opening/closing ring with respect to the support sill the elastic means having a top end fixed to the valve stem and a bottom end pressing the opening/closing ring, wherein when an excessive pressure occurs within the main body of the aerosol vessel, the opening/closing ring moves upward to discharge overcompressed gas.

2. An aerosol vessel, comprising:

an integral main body having an opened top and a hermetically sealed bottom; and an aerosol valve assembly including;

a support member coupled to a top portion of the main body;

a nozzle body fixed at the support member, including an opened end, a space communicating with an inside of the main body, and a support sill protruding into the space;

a valve stem disposed in the space of the nozzle body, the valve stem comprising a gas inlet through which gas within the space of the nozzle body flows into the valve stem, and a gas ejection passage through which the gas flowing in through the gas inlet is ejected to an outside of the aerosol vessel;

an opening/closing ring surrounding an outer circumference of the valve stem to open or close the gas inlet, the opening/closing ring contacting the support sill of the nozzle body and being removably supported by the support sill; and elastic means for restoring the valve stem after an operation of the assembly and elastically supporting the opening/closing ring with respect to the support sill, the elastic means having a top end fixed to the valve stem and a bottom end pressing the opening/closing ring, wherein when an excessive pressure occurs within the main body, the opening/closing ring moves upward to discharge overcompressed gas;

wherein the support member of the aerosol valve assembly is coupled to the top portion of the main body.

3. The aerosol vessel of claim 2, wherein the top of the main body is coupled with a top sealing cap and the bottom of the main body is coupled with a bottom sealing cap, and wherein the support member of the aerosol valve assembly is coupled to the top sealing cap.

4. An aerosol valve assembly for an aerosol vessel filled with contents and propellant gas, for discharging the contents or stopping discharging, the aerosol valve assembly comprising:

a support member coupled to a top portion of a main body of the aerosol vessel and having an opening portion through which a valve stem is pierced;

a nozzle body fixed at the support member, including an opened end, a space communicating with an inside of the main body, and a support sill protruding into the space;

the valve stem disposed in the space of the nozzle body, the valve stem comprising a gas inlet through which gas within the space of the nozzle body flows into the valve stem, a keeping groove which communicates with the gas inlet, and a gas ejection passage through which the gas flowing in through the gas inlet is ejected to an outside of the aerosol vessel;

an opening/closing ring surrounding an outer circumference of the valve stem to open or close the gas inlet, the opening/closing ring contacting the support sill of the nozzle body and being removably supported by the support sill;

a contact spring which applies pressure to the opening/closing ring with respect to the support sill of the nozzle body is compressed when a pressure exceeding a set value occurs within the main body and is installed between the support member and the opening/closing ring; and a support spring for restoring the valve stem to an original position after operation, wherein a discharge gap is formed between the opening portion of the support member and a portion of the valve stem above the gas inlet, and wherein, when excessive pressure occurs within the main body of the aerosol vessel, overcompressed gas escapes the main body through a gap between the support sill of the nozzle body and the opening/closing ring and is discharged through the discharge gap.

5. An aerosol vessel comprising:

an integral main body having an opened top and a hermetically sealed bottom; and an aerosol valve assembly including:

a support member coupled to a top portion of the main body having an opening portion through which a valve stem is pierced;

a nozzle body fixed at the support member, including an opened end, a space communicating with an inside of the main body, and a support sill protruding into the space;

the valve stem disposed in the space of the nozzle body, the valve stem comprising a gas inlet through which gas within the space of the nozzle body flows into the valve stem, a keeping groove which communicates with the gas inlet, and a gas ejection passage through which the gas flowing in through the gas inlet is ejected to an outside of the aerosol vessel;

an opening/closing ring surrounding an outer circumference of the valve stem to open or close the gas inlet, the opening/closing ring contacting the support sill of the nozzle body and being removably supported by the support sill;

a contact spring which applies pressure to the opening/closing ring with respect to the support sill of the nozzle body is compressed when a pressure exceeding a set value occurs within the main body and is installed between the support member and the opening/closing ring; and a support spring for restoring the valve stem to an original position after operation, wherein a discharge gap is formed between the opening portion of the support member and a portion of the valve stem above the gas inlet, and wherein, when excessive pressure occurs within the main body of the aerosol vessel, overcompressed gas escapes the main body through a gap between the support sill of the nozzle body and the opening/closing ring and is discharged through the discharge gap.

wherein the support member of the aerosol valve assembly is coupled to the top portion of the main body.

6. The aerosol vessel of claim 5, wherein the top of the main body is coupled with a top sealing cap and the bottom of the main body is coupled with a bottom sealing cap, and wherein the support member of the aerosol valve assembly is coupled to the top sealing cap.

* * * * *